United States Patent [19]

Gille et al.

[11] 4,320,329

[45] Mar. 16, 1982

[54] WINDSHIELD WIPER CONTROL CIRCUIT

[75] Inventors: Gunther Gille, Sersheim; Horst Goertler, Sachsenheim; Hans Prohaska, Bietigheim-Bissingen, all of Fed. Rep. of Germany

[73] Assignee: ITT Industries, Inc., New York, N.Y.

[21] Appl. No.: 146,299

[22] Filed: May 5, 1980

[30] Foreign Application Priority Data

May 9, 1979 [DE] Fed. Rep. of Germany ....... 2918658

[51] Int. Cl.³ .............................................. H02P 1/04
[52] U.S. Cl. .................................... 318/443; 318/306; 318/308; 318/445; 15/250.12
[58] Field of Search ........... 15/250.02, 250.12, 250.16, 15/250.17, 250.13; 307/141; 318/306, 308, 309, 332, 443, 444, 445, 447, 469, 484

[56] References Cited

U.S. PATENT DOCUMENTS

| | | | |
|---|---|---|---|
| 3,656,042 | 4/1972 | Keisuke | 318/444 |
| 4,037,146 | 7/1977 | Kondo | 318/444 |
| 4,158,798 | 6/1979 | Holt | 15/250.12 X |

Primary Examiner—Ulysses Weldon
Attorney, Agent, or Firm—James B. Raden; William J. Michals

[57] ABSTRACT

A windshield wiper motor control circuit for controlling a motor which is normally operated in either continuous or intermittent modes and wherein during the intermittent mode the motor is responsive to a voltage source controlled by a pulse generator. In response to low motor speed and voltage conditions and during overload conditions, the control circuit reverts to intermittent operation and the duration between pulses is adjusted to prevent overheating or destruction of the motor.

5 Claims, 7 Drawing Figures

WINDSHIELD WIPER CONTROL CIRCUIT

BACKGROUND OF THE INVENTION

This invention starts from a wiper installation according to the features of the preamble of the appended claims.

Often the torque of the wiper motor in wiper installations is insufficient to move the wiper blade over a dry pane. Also in the winter, when it is heavily snowing, the wiper blade and thus also the motor is blocked. In such a case the motor is subject to a considerable thermal load. In order to protect the motor against destruction thermoswitches are connected into the operating circuit, which are periodically interrupting and closing it. The motor is then energised in intermittent operation, whereby the ratio of pulse duration to pulse interval must be so small that for all that the motor is not overheated. The switching process of such thermoswitches is, however, also affected by the outside temperature, so that under certain circumstances they may be switched off too during undisturbed operation.

Besides it is difficult to realize a sufficiently big pulse interval. Until now it was therefore practiced to design the motor in a way that in case of blocking it gets over a given switching-on time without damages. This can only be achieved by a corresponding insulation of the armature winding; this, however, is very expensive.

The invention is based on the problem to develop a wiper installation of the type mentioned above in a way that in case of overload the wiper motor is reliably protected against destruction, whereby the measures necessary for this purpose are to be integrated into usual installations as economically as possible. This integration necessitates that the wiring in the motor vehicle must be retained as far as possible.

SUMMARY OF THE INVENTION

This problem is solved by the characterising features of the present invention.

The invention is thereby based on the idea that usual wiper installations, which are designed for intermittent operation too, are already having a pulse generator which instead of the known thermoswitch is used to control the motor in pulse operation in case of an undue load.

According to the present invention it is thus found out by suitable measures, whether the motor is overloaded. If this is the case the already available pulse generator is activated in a way that the motor is now controlled in pulse operation, whereby the pulse-duty factor of this pulse sequence is to be adjusted in a way that the motor gets over this periodical control without damages.

For this purpose the number of revolutions will preferably directly be measured. It is, however, as well imaginable indirectly to pick up speed or load of the motor by e.g. finding out the current consumption. In any case a switching stage is to respond as soon as during this picking up of the measured value a given extreme value is exceeded.

In the simplest way the operating switch could be of such design that in case of overload the continuous operation position is changed over into the intermittent operation position. Without additional measures this is, however, only reasonable, when the adjusted pulse interval during intermittent operation is long enough. If this is not the case, when the switching stage responds the pulse generator will have to be adjusted in addition in a way that the biggest possible pulse interval is adjusted, or as it will mostly be with conventional installations, a pulse interval is adjusted which is substantially bigger than the possible maximum pulse interval during intermittent operation.

This can be very easily realized in embodiments with a free running astable pulse generator as also in embodiments with a pulse generator triggered by a parking position switch, in that the delay element determining the pulse interval is varied in the sense of a bigger time constant.

Another embodiment of the present invention provides an especially simple version of the speed supervising switching stage. Of course other versions are imaginable, especially when in the future the wiper motor will be controlled via microprocessors or microcomputers respectively.

Other embodiments of the present invention refer to circuit arrangements with the presently mostly used pulse generator in the shape of a monostable multivibrator which is triggered by the parking position switch. For this purpose it is provided that this multivibrator is set—as in itself known—when the operating switch is switched on thus as well in the intermittent operation position as also in the continuous operation position and thereby the wiper motor is switched on without delay. In the off-position and in the intermittent operation position the resetting into the instable switching phase is released via the parking position switch. In the continuous operation position, however, this resetting shall not be possible. Moreover in all modes of operation a resetting of this multivibrator is provided in dependence on a pulse released by the speed supervising switching stage. Thereby the timing element determining the pulse interval is varied in dependence on the kind of the resetting pulse. If the parking position switch releases the resetting signal, undisturbed operation can be assumed. The installation is operated in normal intermittent operation. If the motor, however, does not occupy the parking position, when the multivibrator is reset, the motor is obviously blocked and the timing element is changed over to a very long delay time. Thus this differentiation can be made in dependence on the position of the parking position switch.

Still other embodiments refer to concrete switching alternatives which to a far extent are approaching the versions of series production.

BRIEF DESCRIPTION OF THE DRAWINGS

The invention is described below by means of the circuit diagram shown in FIG. 1. The FIGS. 2 to 7 are showing various wiring diagrams of the entire installation, whereby the control device is only shown schematically.

DETAILED DESCRIPTION

Figure 1:
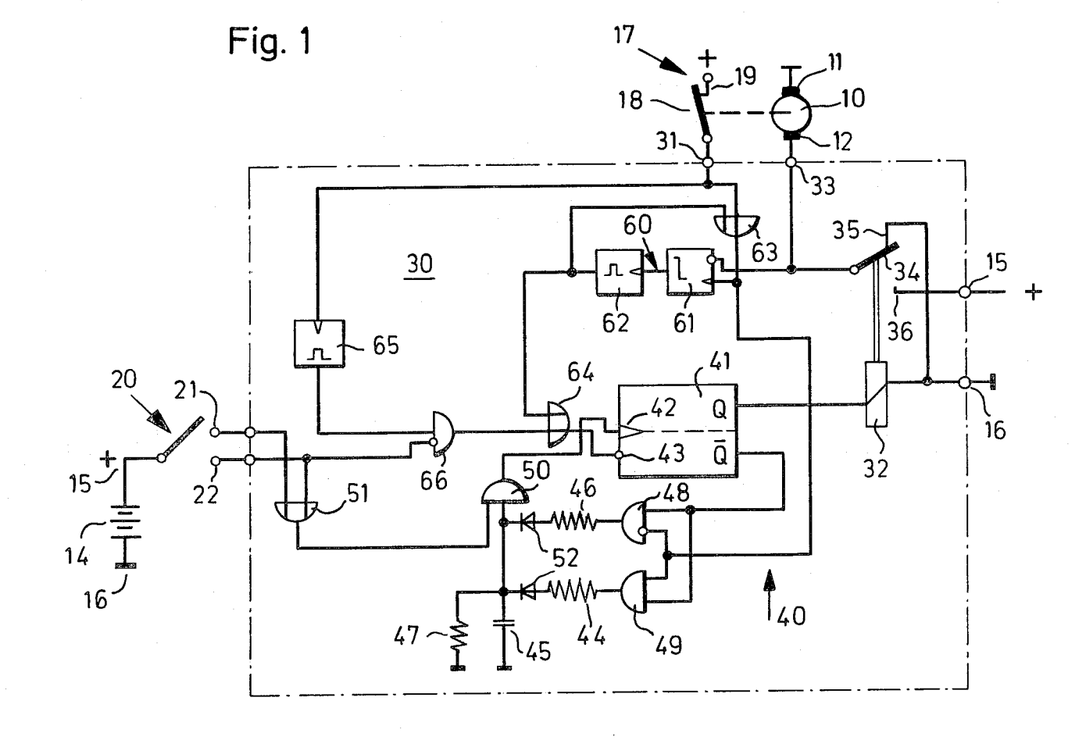

The wiper motor 10 has three terminals 11, 12, 13 of which only two are shown in FIG. 1. It is fed out of a voltage source 14 with the positive terminal 15 and the negative terminal 16. To the wiper motor 10 a parking position switch 17 with the movable bridging contact 18 and the stationary contact 19 is assigned, which is connected with the first terminal 15 of the voltage source. Only in the parking position the bridging contact 18 is rested upon the stationary contact 19. The parking position switch is connected to the input of a control device as a whole designated by 30.

Component part of this control device 30 is a changeover relay 32 serving as a switching element for the motor current and comprising a changeover bridging contact 34 connected to the output 33, whereby said changeover bridging contact cooperates with the break contact 35 connected to earth and with the make contact 36 connected to the positive terminal. The relay 32 is controlled via a monostable multivibrator as a whole designated by 40. This multivibrator consists of a flip-flop with a trigger input 42 and a resetting input 43 which both are reacting to positive signals. Two timing elements are assigned to the flip-flop 41. The one timing element consists of the low-resistance resistor 44 and the capacitor 45. The capacitor of the other timing element is charged via the high-resistance resistor 46. A resistor 47 discharges the capacitor. For the inverted output signal of the flip-flop two gates 48 and 49 are connected in series to the resistors 44 and 46. Both gates are controlled by the same switching signal, but this is conducted to the gate 48 via an inverting input. Consequently only one each of the two timing elements is effective. In the rest condition the inverted output Q of the flip-flop is activated and the capacitor 45 is charged. The timing elements are decoupled via diodes 52. The timing elements are fed back to the trigger input 42 via a gate 50. The gate 50 is connected through, when the operating switch 20 is either positioned in the intermittent operation position (contact 21) or in the continuous operation position (contact 22). The corresponding control signal is conducted to the gate 50 via the OR-gate 51.

The monostable multivibrator operates as follows: If the operating switch 20 is brought into an operating position, the multivibrator is set. The output Q is activated, the inverting output Q is switched off. Thereby both gates 48,49 are locked and the capacitor 45 discharges. If the flip-flop 41 is now reset on the input 43 by a resetting signal to be described later, the inverting output Q is again activated. The capacitor 45 recharges via one of the resistors 44 or 46. If the gate 50 is opened, a trigger pulse for the flip-flop 41 is released again as soon as the capacitor voltage exceeds a given threshold value. Thus during the instable switching position of the multivibrator the capacitor 45 is charged, whereby the charging time determines the pulse interval. Under certain circumstances it can be necessary that the capacitor is followed by a threshold value stage. The switching stage 60 for picking up the speed consists of a timing element 61 with operate delay with a following monoflop 62. The timing element 61 is set in dependence on the switching position of the relay 32 as soon as operating current is supplied to the motor. It is reset by the parking position switch 17 in the parking position or by the switching pulse of the monoflop 62 via the OR-gate 63. If the motor 10 is applied to voltage and the timing element 61 is thus set, after expiration of a delay time which is bigger than the time required for a wiping cycle the monoflop 62 releases a pulse unless the motor has reached its parking position within the delay time of the timing element 61 and therefore the timing element 61 is reset again.

The pulse of the monoflop 62 is conducted to the resetting input of the flip-flop via an OR-gate 64. In the parking position the parking position switch releases a pulse via the monoflop 65 too, whereby said pulse resets the flip-flop 41 as well via the gate 66 and the OR-gate 64. But this gate 66 is locked, of continuous operation is switched on via the operating switch.

The wiper installation operates as follows: In the rest position the relay 32 is de-energised and thus the motor 10 is short-circuited. If intermittent operation is selected on a positive signal is conducted to the trigger input 42 via the OR-gate 51 and the gate 50 (the capacitor 45 is charged) and the flip-flop is set. The relay 32 is energised and the motor is applied to voltage. The capacitor 45 discharges via the resistor 47. The gate 66 is opened.

The wiper motor 10 moves and opens the parking position switch 17 which is only closed after completion of a wiping cycle. Thus the monoflop 65 releases a pulse which resets the flip-flop 41 via the gate 66 and the OR-gate 64 and thus de-energizes the relay 32. The motor is short-circuited. Because the parking position switch conducts positive potential to the control inputs of the gates 48, 49 via the OR-gate 63 only the 49 is opened. The capacitor recharges relatively quickly via the low-resistance resistor 44 and then again triggers the flip-flop 41 via the gate 50. Resistor 44 and capacitor 45 determine the interval time during normal intermittent operation.

In case it is changed over to continuous operation the gate 66 is locked and thus the resetting pulse of the monoflop 65 released by the parking position switch 17 is blocked. Thus the relay 32 remains energised. The capacitor 45 remains discharged. If the operating switch 20 is now reset, the motor 10 remains applied to voltage until the parking position is reached. The flip-flop 41 is reset and the capacitor 45 recharged. This, however, has no effect, because the gate 50 is locked now.

During intermittent operation and during continuous operation the timing element 61 is set as soon as the relay 32 is energised. It is reset as soon as in the parking position the parking position switch switches positive potential on the resetting input. If during continuous operation the relay remains energised, the timing element is immediately set again as soon as the parking position switch opens. As well during continuous operation as also during intermittent operation the timing element 61 is always reset before expiration of the delay time as long as the wiper installation is operating properly. If the wiper motor 10 is blocked, however, the parking position switch no longer comes into the parking position. The delay time of the timing element expires and the monoflop 62 releases a pulse which resets the flip-flop and thereby the multivibrator. Because now no positive potential is supplied by the parking position switch the gate 48 is opened, but the gate 49 is locked. The capacitor 45 is charged via the high-resistance resistor 46. Now the pulse interval is substantially bigger. After expiration of this pulse interval the relay 32 is again energised and thus the motor is applied to voltage. Simultaneously the timing element 61 is set again and the process is repeated, when the motor 10 continues to be blocked.

Thus it has to be stated that with blocked motor the switching element (relay 32) is controlled during pulse operation, whereby the pulse generator (multivibrator 40) is used which controls the switching element during intermittent operation too. At the same time, however, the pulse interval is substantially increased by changing over the timing element.

By way of the FIGS. 2 to 7 different wiring diagrams of an entire installation are represented. It can be recognized from these wiring diagrams that the operating switch 20 has a first bridging contact 70 which in the off-position, in the intermittent operation position and in a first continuous operation position connects the output 33 of the control device shown only schematically with the brush 12 for slow wiper speed and in a second continuous operation position with the brush 13 for rapid wiper speed. In the intermittent operation position a second bridging contact 71 conducts a reduced current or a reduced voltage to the control device via the resistor 72, but as a rule full potential in the operating positions. The control device 30 has a current or voltage indicator which either activates the contact 21 shown in FIG. 1 or the contact 22. The parking position switch 17 operates like in FIG. 1, however does not switch positive potential, but earth.

Figure 2:
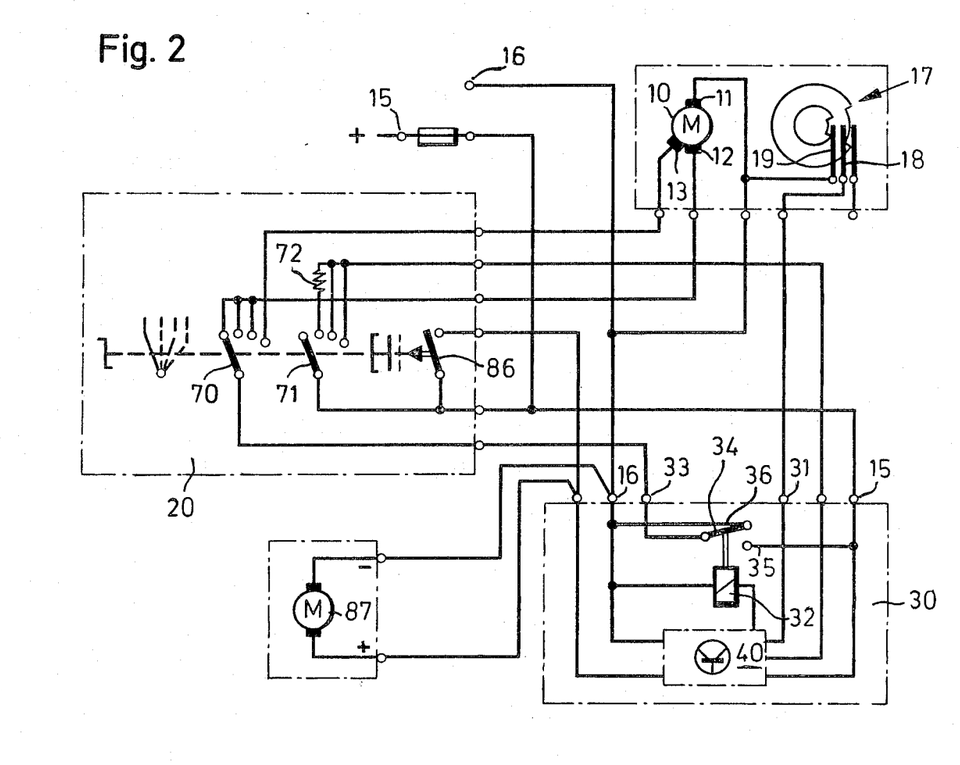

From FIG. 2 it can be seen that the motor current fundamentally flows via the movable changeover contact 34 of the relay 32 and the bridging contact 70 of the operating switch. The same is valid for the short-circuit current, for the break contact 35 of the relay is directly and unchangeably connected to earth. The parking position switch is only operating as control signal switch and neither carries operating current nor short-circuit current. Consequently in all modes of operation a blocking protection is ensured, also when the operating switch is switched off. By a comparison with known circuit arrangements it can be recognized that only unimportant changes of the operating switch and of course of the control device are necessary, but that the wiring between operating switch, motor and control device was not changed.

Figure 3:
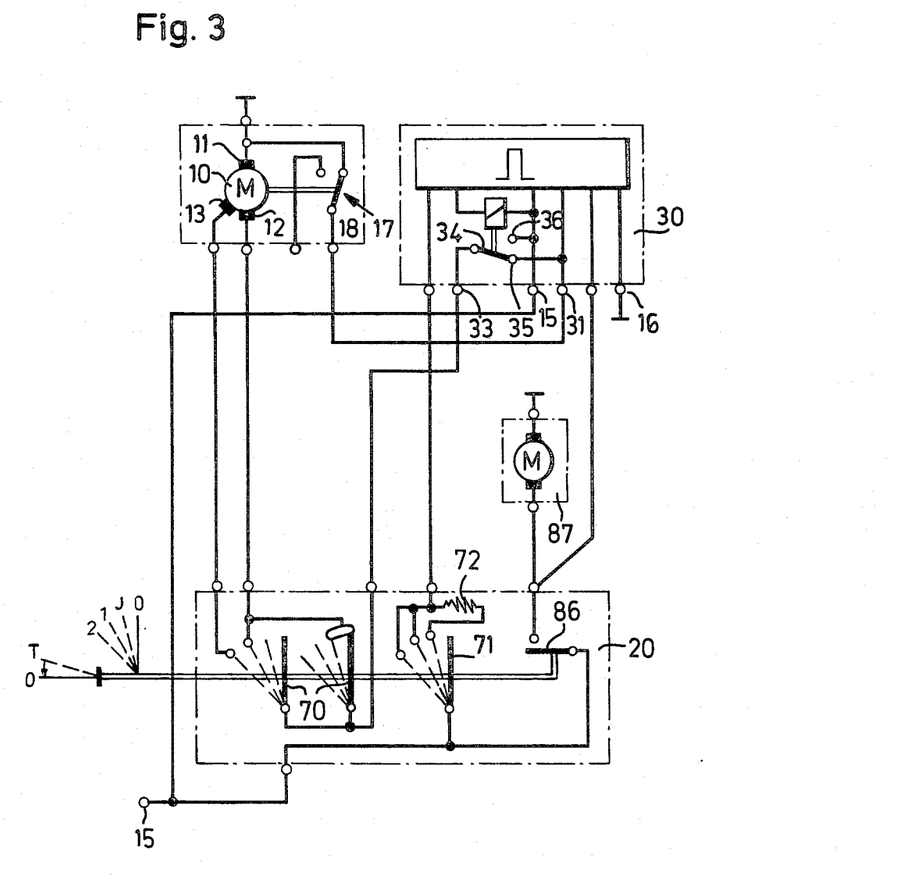

FIG. 3 differs from FIG. 2 substantially in that the break contact 35 of the relay is now switched via the parking position switch 17. It is thus only applied to earth in the parking position. Thus the parking position switch is located in the braking current circuit and must correspondingly be designed for higher currents. On the other hand it is advantageous that during pulse operation the motor, when it is blocked, is not unnecessarily short-circuited again and again, for in this case the parking position switch is opened.

Figure 4:
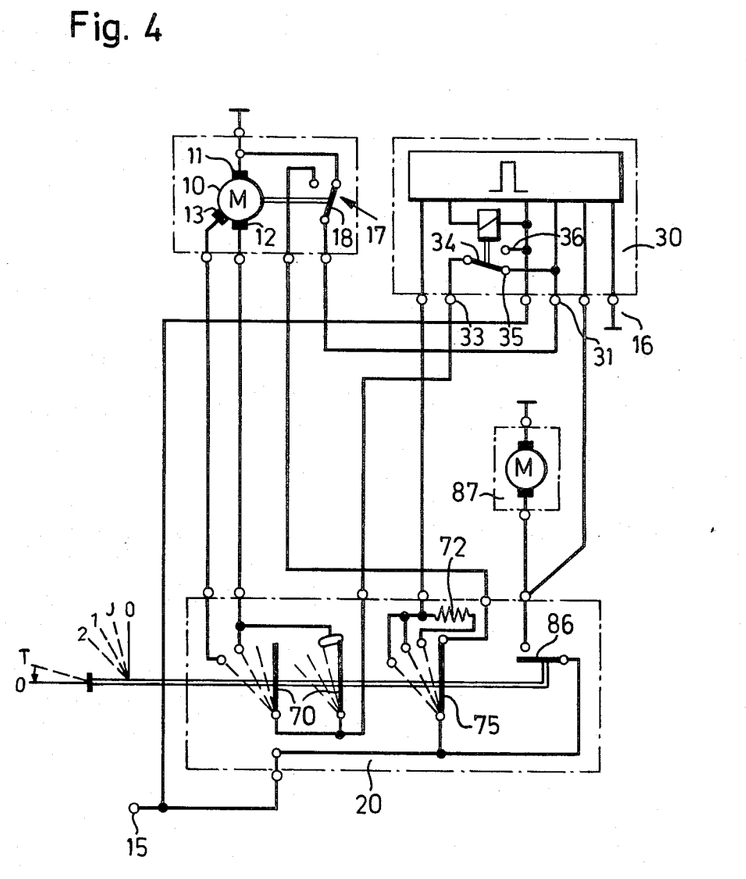

In the version according to FIG. 4 the parking position switch in well-known manner is designed as a changeover switch 17, the make contact of which is connected with the positive terminal of the voltage source via a bridging contact 75 of the operating switch in its off-position. Now this parking position switch conducts motor current in order to enter the wipers into the parking position which is of advantage insofar that the motor current is interrupted, when the relay is defect. On the other hand in the off-position of the operating switch no blocking protection is ensured, because as well the break contact 35 of the relay is applied to positive potential via the parking position switch as long as the wiper did not reach its end position. This disadvantage can, however, be accepted, because the parking position switch is very seldom blocked and a destruction of the motor can besides be avoided by changing over of the operating switch.

Figure 5:
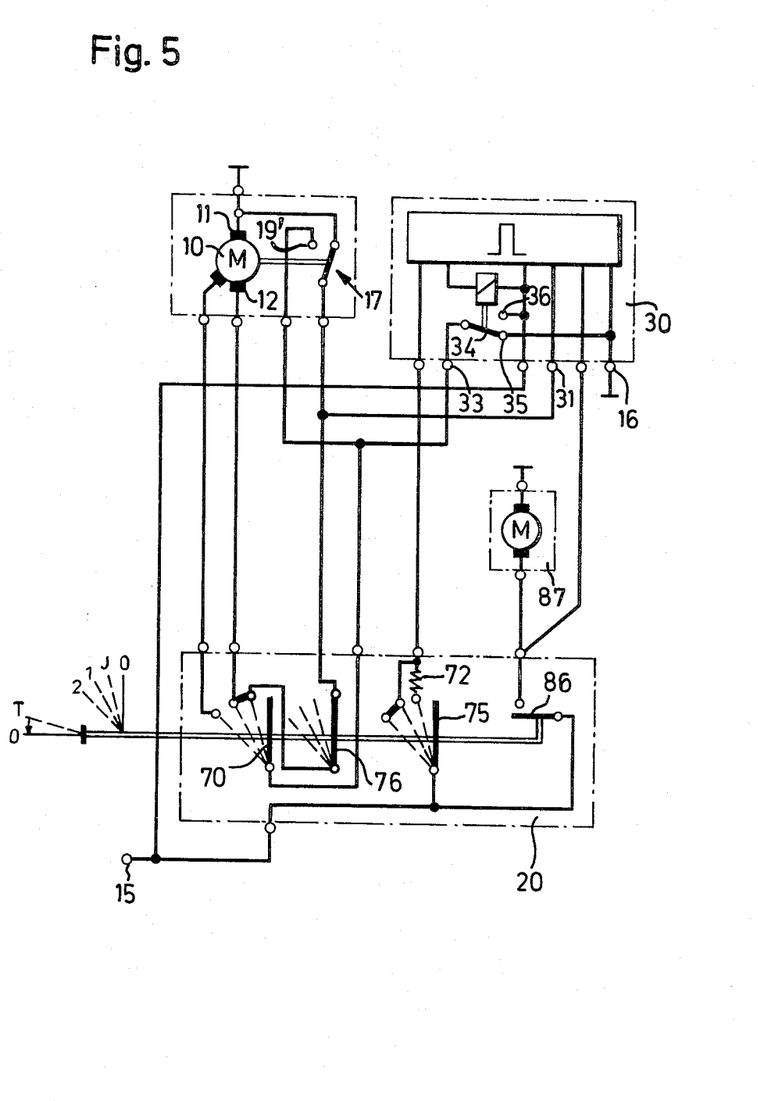

In the embodiment according to FIG. 5 the output 33 of the control device 30 in the off-position of the operating switch is connected to the motor via the parking position switch (make contact 19')and an additional switching bridge 76 of the operating switch. Thus the parking position switch carries motor current again. In contrast thereto in the operating positions this current path is bridged, for the switching bridge 70 is also connected to the output 33.

Figure 6:
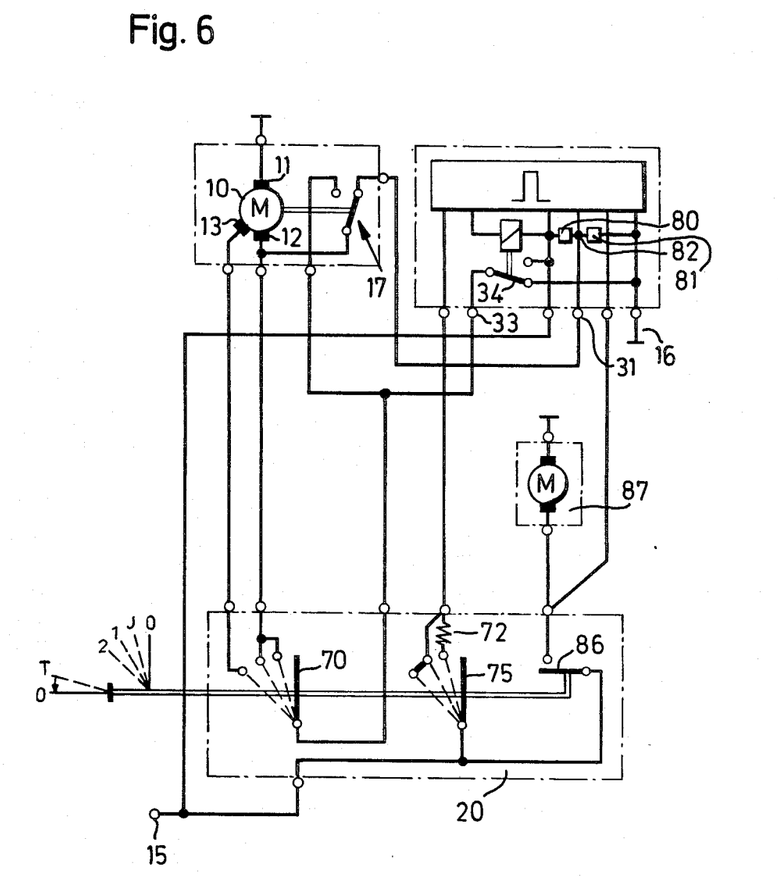

FIG. 6 shows an embodiment with a parking position switch 17 wired in another in itself known manner. Now the break contact of the parking position switch is connected to the control input 31 of the control device. On this control input in the parking position either positive or negative potential is applied, outside of the parking position the control input is free from potential. In order to differ the signals on the control input clearly two resistors 80, 81 with equal resistance are provided, which are connected in series between the positive and negative terminal. In the switching point 82 between these two resistors thus outside of the parking position half of the battery voltage can be tapped off, which can be evaluated by a correspondingly designed voltage indicator.

Figure 7:
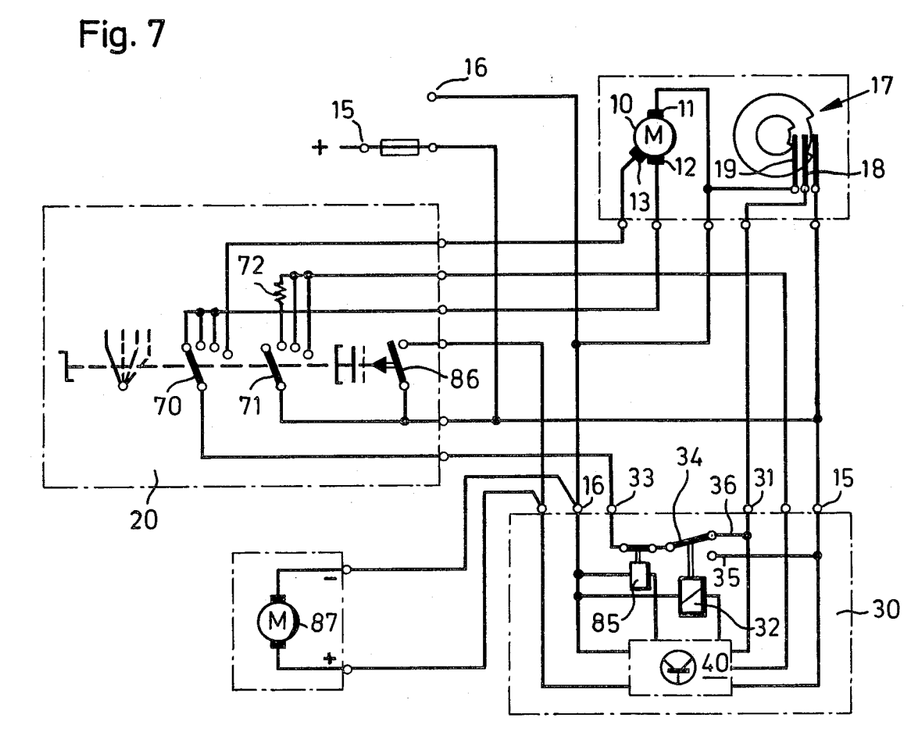

By FIG. 7 is shall be indicated that the basic idea of the invention can of course be realized in that beside the usual relay 32 switched in intermittent operation a further relay 85 is connected into the motor circuit and responds in case the motor is blocked. But this relay is controlled too by the pulse generator for intermittent operation which indeed is changed over with respect to the delay time.

Finally it is pointed out with respect to FIGS. 2 to 7 that via the control device also a washing pump motor 87 can be energised, when a washing key is actuated, as it is known in itself.

Usually a wiping programme too is carried out, when this washing key is actuated.

In the FIGS. 2 to 7 the individual bridging contacts and contacts of the operating switch are no longer necessary. They are only shown in the drawing in order to indicate that the entire wiring corresponds to the present versions without substantial changes.

In an introduction phase the control device 30 will probably be built up with concrete building-blocks. It is, however, intended to produce the control device in integrated technique and that either with an especially developed integrated circuit or by use of microprocessors or microcomputers. It will also be provided that the motor current does no longer flow through the operating switch, but that the operating switch only switches control circuits. If thereby different wiper speeds should be required in the future too and the motor therefore should be energised via different brushes, a second relay could be necessary to change over the speed. It is imaginable too to control the motor via one brush only and to regulate the speed by electronic means.

What is claimed is:

1. A control circuit for the windshield wiper system of a motor vehicle and of the type which comprises an electric motor being operable over wiping cycles and means including an operating switch for controlling said motor between continuous and intermittent modes of operation and wherein a voltage source is applied to the motor by way of a switching element which during the intermittent mode of operation is controlled by a pulse generator which is coupled to said switching element by said operating switch, said control circuit comprising: means for detecting the speed of said motor, switching means coupled to said switching element and responsive to the detecting means for controlling said motor into said intermittent mode of operation when the detected speed of said motor is less than a predetermined value, and timing means coupled to said pulse generator and responsive to said switching means for increasing the duration between successive ones of the pulses generated by said pulse generator when the detected speed of said motor is less than said predetermined value.

2. The control circuit according to claim 1, wherein said pulse generator is a monostable multivibrator and said timing means includes first and second timing elements, wherein said multivibrator is responsive to one of first and second timing elements wherein said first timing element is operative during normal intermittent operation when the speed of said motor exceeds said predetermined value and said second timing element is operative when said speed of said motor is less than said predetermined value.

3. The control circuit according to claim 2, wherein said wiper system includes a parking position switch cooperating with said switching means, the detecting means and said timing means and having a pair of operative contacts mechanically coupled to said motor and electrically coupled between a point of given potential, with respect to a point of reference potential, and the inputs of the detecting means and said first and second timing elements for selectively operating one of said first and second timing elements in response to the position of said wiping cycle wherein the closed contacts of said parking switch deactivate the detecting means and wherein said contacts are closed after the completion of a wiping cycle.

4. The control circuit according to claim 3, wherein said parking position switch activates said second timing element and the detecting means when said motor translates away from its parking position to open the contacts of said parking switch in the wiping cycle.

5. The control circuit according to claim 4, wherein said switching element is a changeover relay having an input winding coupled to the output of said multivibrator and a pair of normally open contacts one contact of which is coupled to a voltage source and the other contact of which is coupled to said motor and said switching means.

* * * * *